United States Patent [19]

Motozato et al.

[11] 4,312,980
[45] Jan. 26, 1982

[54] PROCESS FOR PREPARING POROUS CELLULOSE SPHERICAL PARTICLES

[75] Inventors: Yoshiaki Motozato, 1174-5, Hotakubohon-machi, Kumamoto-shi, Kumamoto-ken, Japan; Hiroaki Ishibashi, Minamata, Japan

[73] Assignees: Chisso Corporation; Yoshiaki Motozato, both of Tokyo, Japan

[21] Appl. No.: 173,713

[22] Filed: Jul. 30, 1980

[30] Foreign Application Priority Data

Aug. 3, 1979 [JP] Japan .................. 54/98631

[51] Int. Cl.³ .................. C08B 3/06; C08B 3/26
[52] U.S. Cl. .................. 536/76; 106/122; 106/189; 106/198; 252/427; 252/448; 536/69; 536/82
[58] Field of Search .................. 23/293 R; 536/76, 82, 536/69; 106/122, 189, 198; 252/427, 448

[56] References Cited

U.S. PATENT DOCUMENTS

| | | | |
|---|---|---|---|
| 2,722,528 | 11/1955 | Johnson | 536/82 |
| 3,592,672 | 7/1971 | Rowley et al. | 106/122 |
| 3,852,224 | 12/1974 | Bridgeford | 106/122 |
| 4,055,510 | 10/1977 | Peska et al. | 232/426 |
| 4,090,022 | 5/1978 | Tsao et al. | 536/57 |
| 4,118,449 | 10/1978 | Rinde | 106/122 |
| 4,171,987 | 10/1979 | Horiguchi et al. | 106/122 |
| 4,234,528 | 11/1980 | Nussbaumer et al. | 536/76 |

FOREIGN PATENT DOCUMENTS

| | | |
|---|---|---|
| 52-11237 | 3/1977 | Japan . |
| 53-7759 | 1/1978 | Japan . |
| 1160085 | 7/1969 | United Kingdom . |

Primary Examiner—Bradley Garris
Attorney, Agent, or Firm—Fred Philpitt

[57] ABSTRACT

A solution of cellulose triacetate in a mixed solvent consisting essentially of a chlorinated hydrocarbon with a boiling point lower than that of an aqueous medium and an aliphatic higher alcohol with 6 or more than 6 carbon atoms is suspended into the aqueous medium to form droplets of the above-mentioned solution, and then the chlorinated hydrocarbon in the droplets is removed by evaporation to obtain spherical particles of cellulose triacetate containing the aliphatic higher alcohol. The spherical particles thus obtained are saponified and removed of the aliphatic higher alcohol, to prepare porous cellulose spherical particles.

9 Claims, No Drawings

PROCESS FOR PREPARING POROUS CELLULOSE SPHERICAL PARTICLES

FIELD OF THE INVENTION

This invention relates to a novel process for preparing porous cellulose spherical particles.

DESCRIPTION OF THE PRIOR ART

Gel filtration processes, that is fractionating processes of materials utilizing the difference of molecular sizes, are already known and employed for purifications of materials, desalting, etc. The gel filtration processes are usable in an aqueous solution and in an organic solvent, and applicable for any compound having any molecular weight and have been employed both in a laboratory scale and an industrial scale. There are many materials conventionally used for the gel filtrations such as dextran gel crosslinked with epichlorohydrin, polyacrylamide gel, agarose gel, and cellulose gel (porous cellulose), etc.

Among these materials, cellulose gel has for example the following advantages:

(1) Since it has a higher physical strength and is difficult to deform, a higher flow rate is applicable when it is utilized in column chromatography.

(2) Adsorption of protein is small. (Dextran gel, etc. may adsorb some kinds of proteins.)

(3) It is stable against swelling and shrinkage.

(4) It is stable against organic solvents.

A process for preparing a gel filtering material based on cellulose has been described in Japanese patent published specification No. 11237/1977. According to the process, cellulose is dissolved in an ammoniacal copper hydroxide solution, etc. at a concentration of 1~12%, and then the cellulose solution is added dropwise into benzene containing an emulsifying agent and dispersed in it, the dispersion being introduced in a regeneration bath to obtain cellulose fine spherical particles. Cellulose gel filtering material obtained by this process is said to have cellulose density of 2~25% (W/V) and pore sizes within the range from 2 to 2000 m$\mu$. Therein, cellulose density [%(W/V)] shall be represented by the following equation:

Cellulose density $= [W/(Vt - Vo)] \times 100$, wherein W means weight (g) of cellulose gel filtering material particles, Vt means total bed volume (ml), i.e. volume of a part of a separating column wherein the filtering material particles are filled, and Vo means void volume, i.e. elution volume (ml) until dextran reaches the bottom of the bed when a solution of high molecular weight dextran impermeable to pores in the filtering material particles is flowed down from the top of the filled bed.

According to the above-mentioned process, it is difficult to prepare the cellulose particles with good reproducibility, having desired cellulose densities or excluded critical molecular weight, particularly having large cellulose densities and small excluded critical molecular weights. Further, since the cellulose densities of gel filtering material thus obtained is small, it has shortcomings such as little physical strength.

In Japanese patent laid-open specification No. 7759/1978, a preparation method is described in which a solution of cellulose triacetate dissolved in methylene chloride, etc. is added dropwise into an aqueous medium with stirring to form suspended particles, and then spherical particles of cellulose triacetate are formed by evaporating the solvent, and thereafter they are saponified to prepare cellulose spherical particles. According to the process, real spherical cellulose particles can be formed but it is difficult to prepare, with good reproducibility, cellulose particles having a desired relatively small cellulose density or a desired relatively large excluded critical molecular weight.

SUMMARY OF THE INVENTION

An object of the invention is to provide a process for preparing, with good reproducibility, porous cellulose spherical particles having a desired density or excluded critical molecular weight as well as high physical strength. We have found that the above-mentioned object may be attained by making a solution of cellulose triacetate containing an aliphatic higher alcohol in the method described in said Japanese patent laid-open specification No. 7759/1978 and made up this invention from this finding.

According to the present invention, porous cellulose spherical particles are prepared, wherein a solution of cellulose triacetate in a mixed solvent consisting essentially of a chlorinated hydrocarbon with a boiling point lower than that of an aqueous medium mentioned below and an aliphatic higher alcohol with 6 or more than 6 carbon atoms is suspended into the aqueous medium to form droplets of the above-mentioned solution, and the chlorinated hydrocarbon in the droplets is then evaporated and removed, whereby spherical particles of cellulose triacetate containing the aliphatic higher alcohol are obtained, which are then saponified, and freed of the aliphatic higher alcohol.

DETAILED DESCRIPTION OF THE PREFERRED EMBODIMENTS

As cellulose triacetate (hereinafter abbreviated as TAC), there may be generally employed those obtained by acetating linter pulp, and wood pulp, etc. with acetic acid or acetic anhydride, cellulose triacetate with an acetylation degree of about 60% being preferred.

As chlorinated hydrocarbon, there may be employed e.g. dichloromethane, chloroform, carbon tetrachloride, dichloroethane, trichloroethane and trichloroethylene, etc. alone or in admixture of 2 or more than 2 above-mentioned compounds. The chlorinated hydrocarbons may be used, as a main component, in admixture with a small amount of other organic solvents such as methanol, ethanol, acetone or nitromethane, etc.

According to the present invention, the process described in Japanese patent laid-open specification No. 7759/1978 is improved in that an aliphatic higher alcohol with 6 or more than 6 carbon atoms, which has a higher boiling point than that of the above-mentioned chlorinated hydrocarbon, is employed. By saponifying TAC particles containing the aliphatic higher alcohol with 6 or more than 6 carbon atoms inside and, in accordance with necessity, washing or extracting with a hydrophilic organic solvent, the higher alcohol is removed, whereby porous cellulose particles are obtained, wherein the degree of porosity of the cellulose particle may be changed by varying a content of the higher alcohol in the TAC particles. By the change of the porosity, various cellulose solid particles having different excluded critical molecular weight or densities may be obtained. Furthermore, by using the aliphatic higher alcohol with 6 or more than 6 carbon atoms, cellulose spherical particles with a desired value of excluded critical molecular weight or densities can be prepared with good reproducibility. In the case that the above-mentioned higher alcohol being replaced by an alicyclic alcohol such as cyclohexanol or an aliphatic alcohol with 5 or less than 5 carbon atoms such as amyl alcohol and butyl alcohol, etc., the reproducibility becomes bad, and it is difficult to control the excluded critical molecular weight or cellulose density by controlling the content thereof in the TAC particle.

The aliphatic higher alcohol with 6 or more than 6 carbon atoms may be straight chain one or branched chain one, and those with 18 or less than 18, particularly 12 or less than 12, carbon atoms are preferable in the view point of their good solubility in the chlorinated hydrocarbon. Straight chain alcohol is preferable one by the reason of giving a relatively large excluded critical molecular weight.

The amount of the aliphatic higher alcohol used is preferably 15 or less than 15 times by weight, particularly 7 or less than 7 times by weight, relative to the amount of TAC. In the case that the amount of the higher alcohol used being larger, it becomes difficult to prepare spherical particles of TAC. The effect of adding the higher alcohol may be appreciated at the amount of 0.1 times by weight per TAC, more than 0.3 times by weight being preferable.

In order to prepare a solution of TAC in a mixed solvent consisting of a chlorinated hydrocarbon and an aliphatic higher alcohol with 6 or more than 6 carbon atoms, it is preferable to dissolve TAC first in the chlorinated hydrocarbon and then add the higher alcohol to it. Alternatively, after dissolving the higher alcohol in the chlorinated hydrocarbon, TAC may be dissolved in it. The concentration of TAC in the solution is preferable to be $0.1 \sim 15\%$, particularly $0.8 \sim 12\%$, relative to the total amount of the chlorinated hydrocarbon and TAC.

As the aqueous medium for suspending the above-mentioned TAC solution in droplet form, there may be generally employed an aqueous solution containing a dispersant such as gelatine, polyvinyl alcohol, carboxymethyl cellulose, etc., to which TAC solution is added dropwise and stirred. The concentration of the dispersant is preferably $2 \sim 10\%$ relative to the aqueous solution.

Chlorinated hydrocarbon in droplets thus prepared is then removed by evaporation in the suspension. The temperature during the evaporation is preferably higher than the freezing point of the aqueous medium and lower than the boiling point of the chlorinated hydrocarbon. The lower limit of the evaporating temperature is preferably higher than 15° C., and on the other hand its upper limit is preferably below 2° C. lower than the boiling point of the chlorinated hydrocarbon.

Spherical particles of TAC containing the higher alcohol inside may be obtained as described above, and their spherical forms may be maintained after the saponification so that spherical cellulose particles are obtained.

The saponification in the process of this invention may be carried out by the conventional method, generally using $5 \sim 10\%$ of aqueous caustic alkali solution at a temperature from the room temperature to 50° C. with stirring. If necessary, in order to reduce the saponification time, saponification may be carried out after swelling the solid TAC spherical particles obtained using e.g. $40 \sim 90\%$ of aqueous ethanol or methanol solution. In that case, TAC spherical particles may be introduced in a saponification bath after separated from the alcohol solution, or caustic alkali may be added to the alcohol solution containing TAC particles. As the caustic alkali, caustic soda or caustic potash is preferable, and its amount used is preferably from about 1 to 1.5 times of the theoretical amount required for saponifying TAC. After the completion of the saponification, by neutralization of cellulose spherical particles with acid such as hydrochloric acid or acetic acid, etc., the subsequent treating procedures such as washing, etc. may be carried out easily.

During the saponification, most of the higher alcohol may be separated from the particles, but, for the purpose of complete separation of the higher alcohol, it is preferable to wash or extract those cellulose particles obtained with a hydrophilic organic solvent such as methanol, ethanol, isopropanol or acetone or their aqueous solutions.

Porous cellulose spherical particles obtained according to the process of the present invention are useful not only for gel chromatography but also for raw material of ion exchanger or carrier of affinity chromatography, etc. This invention provides a great advantage in the industry, as it can supply porous cellulose spherical particles with various cellulose density or excluded critical molecular weight required in these application by a simple and economical method.

In the following example, parts and % are based on weight unless otherwise indicated. Parts by volume to parts by weight is in the relationship of ml to g. TAC used in each Example is cellulose triacetate KB 175 (TRADEMARK) made by the Celanese Company.

EXAMPLE 1

After 320 parts of TAC (acetylation degree: 60.6%) are dissolved in 4000 parts by volume of dichloromethane, 1600 parts by volume of n-octanol are added, and the solution is added dropwise into 6840 parts of 4% aqueous gelatin solution at 20° C. with stirring. After the completion of the dropwise addition, stirring is continued for some time, thereafter the temperature of the suspension is raised to 38° C., and dichloromethane is evaporated and removed while stirring the suspension by stirrer at 200 rpm, whereby real spherical particles of TAC are obtained. They are filtered, washed with water and saponified as described below. 3200 parts by volume of 75% by volume ethanol are added to the washed particles, and stirred at 50° C. for 30 minutes. Thereafter, 1820 parts of 10% caustic soda solution being added to the ethanol containing the particle and the resulting system is stirred at room temperature for 20 hours. Then, 96 parts of acetic acid are added to the system to neutralize. After filtration and washing with water, remained n-octanol is removed by washing with methanol. After thorough washing with water again, porous cellulose spherical particles are obtained. The particles are classified to make products by collecting particles with diameters of $100 \sim 200$ μm. The physical and chemical properties of products thus obtained are examined by the following methods.

Swelling index:

The sufficient amount of water is added to the products, which are then allowed to stand for more than 6 hours and the volume of gel thus obtained is measured. Then, gel is removed, dried and weighed. Swelling index can be calculated by the formula:

volume (ml)/weight (g)

The swelling index of the product obtained in Example 1 is 8.0.

Cellulose content:

The product is filled into a column with a diameter of 2 cm, and total bed volume Vt (ml) is calculated from inner diameter of column and height of gel layer. Then, blue dextran having molecular weight of 2 millions (aqueous solution is used) is made elute and elution volume as void volume Vo (ml) is measured. After washing cellulose filled in the column with water, it is removed from the column. It is dried and weighed to obtain weight W (g). Cellulose density may be calculated from these data according to the following equation.

cellulose density (%) = [W/(Vt − Vo)] × 100

As to the product of Example 1, Vt is 240 ml, Vo is 129 ml and W is 30 g. Cellulose density is 27%.

Excluded critical molecular weight:

The product is filled in a column with a diameter of 4 mm, and aqueous solutions of polyethylene glycols or dextrans with various known molecular weight are poured on it. Elution volume of aqueous solution until the elution point being reached, is measured by means of a differential refractometer (trade mark of SHO-DEX; made by SHOWA DENKO K.K.). Elution volume obtained are plotted against the molecular weights of polyethylene glycol, etc., and the excluded critical molecular weight is obtained as the molecular weight of polyethylene glycol, etc. at a curved point of the line obtained.

The excluded critical molecular weight of the product of Example 1 is 52000.

The process of Example 1 is repeated using various amounts of n-octanol to give a product having the properties shown in Table 1. Obviously from the results, the process of the invention may be carried out with very good reproducibility and cellulose density and excluded critical molecular weight are confirmed to be well controlled.

TABLE 1

| n-octanol (part by volume) | cellulose density (%) | excluded critical molecular weight |
| --- | --- | --- |
| 2240 | 23 | 60000 |
|  | 23 | 61000 |
|  | 24 | 59000 |
| 1600 | 26 | 52000 |
|  | 27 | 50000 |
|  | 28 | 49000 |
| 960 | 34 | 27000 |
|  | 34 | 26000 |
|  | 35 | 26500 |
| 640 | 44 | 12000 |
|  | 45 | 11000 |
|  | 44 | 11500 |
| 320 | 58 | 4500 |
|  | 59 | 4000 |
|  | 60 | 3500 |
| 0 | 72 | 1100 |
|  | 71 | 1200 |
|  | 71 | 1000 |

EXAMPLE 2

320 parts of TAC (acetylation degree: 60.8%) are dissolved in 5330 parts by volume of dichloromethane, and then added various amounts of n-heptanol which is shown in Table 2. The solution is added dropwise into 7200 parts of 0.6% aqueous polyvinyl alcohol solution. Thereafter, porous cellulose spherical particles are prepared through procedures similar to Example 1.

The properties of the products examined by the procedure similar to Example 1 (particle size 100~200 μm) are shown in Table 2. It is appreciated that n-heptanol may be controlled with good reproducibility.

TABLE 2

| n-heptanol (part by volume) | cellulose density (%) | excluded critical molecular weight |
| --- | --- | --- |
| 1600 | 30 | 40000 |
|  | 31 | 42000 |
| 960 | 38 | 20000 |
|  | 39 | 20000 |
|  | 40 | 21000 |
| 640 | 46 | 10000 |
|  | 46 | 10000 |
|  | 47 | 11000 |
| 320 | 59 | 4000 |
|  | 59 | 4000 |
|  | 60 | 3900 |
| 160 | 65 | 2500 |
|  | 65 | 2400 |

EXAMPLE 3

320 parts of TAC (acetylation degree: 60.8%) are dissolved in 8000 parts by volume of dichloromethane, and then 1600 parts by volume of 2-ethyl hexanol are added. The solution is added dropwise into 10000 parts of 4% aqueous gelatin solution of 20° C. Thereafter, porous cellulose spherical particles are prepared by a method similar to Example 1. The swelling index of the product (particle diameter: 100~200 μm) is 7.5 ml/g, cellulose density is 43%, and excluded critical molecular weight is 15000.

EXAMPLE 4

Porous cellulose spherical particles are prepared according to the method similar to Example 1 except that 2240 parts by volume of n-hexanol is employed instead of n-octanol. The swelling index of the product (particle diameter: 100~200 μm) is 7.1 ml/g, cellulose density is 41%, and excluded critical molecular weight is 18000.

EXAMPLE 5

Porous cellulose spherical particles are prepared according to the method similar to Example 1 except that 640 parts by volume of n-dodecanol is employed instead of n-octanol. The swelling index of the product (particle diameter: 100~200 μm) is 4.6 ml/g, cellulose density is 38% and excluded critical molecular weight is 21000.

Comparative Example

The procedure is repeated similar to Example 1 except that an alcohol shown in Table 3 is employed instead of n-octanol at an amount indicated. The properties of the product obtained (particle diameter: 100~200 μm) are also shown in the Table 3. From these results, when these compounds are employed, reproducibilities of cellulose density and excluded critical molecular weight are appreciated to be poor.

TABLE 3

| solvent | amount added (part by volume) | cellulose density (%) | excluded critical molecular weight |
| --- | --- | --- | --- |
| isoamyl alcohol | 1920 | 43 | 10000 |
|  |  | 54 | 7000 |
| cyclohexanol | 1600 | 42 | 10000 |
|  |  | 54 | 7000 |
|  |  | 56 | 5500 |
|  | 800 | 54 | 7000 |

TABLE 3-continued

| solvent | amount added (part by volume) | cellulose density (%) | excluded critical molecular weight |
|---|---|---|---|
|  |  | 61 | 3000 |

We claim:

1. A process for preparing porous cellulose spherical particles which comprises
   (a) forming a solution of cellulose triacetate in a mixed solvent that consists essentially of
      (1) a chlorinated hydrocarbon and
      (2) an aliphatic higher alcohol with at least six carbon atoms,
   (b) suspending said solution in an aqueous medium to thereby form a plurality of droplets of said solution in said medium, said aqueous medium having a boiling point higher than said chlorinated hydrocarbon,
   (c) removing the chlorinated hydrocarbon from said droplets by evaporation, and
   (d) subjecting the thus obtained spherical particles of cellulose triacetate containing said aliphatic higher alcohol to saponification in order to remove said aliphatic higher alcohol from the spherical particles.

2. The process according to claim 1 wherein said aliphatic alcohol has from 6 to 18 carbon atoms.

3. The process according to claim 1 when said aliphatic alcohol has from 6 to 12 carbon atoms.

4. The process according to claim 1 wherein from 0.1 to 15 times by weight of the aliphatic higher alcohol based on the cellulose triacetate is used.

5. The process according to claim 1 characterized in that from 0.3 to 7 times by weight of the aliphatic higher alcohol based on the cellulose triacetate is used.

6. The process according to claim 1 characterized in that the content of cellulose triacetate in said solution is from 0.1 to 15% based on the total amount of the chlorinated hydrocarbon and the cellulose triacetate.

7. The process according to claim 1 characterized in that the temperature for evaporating and removing chlorinated hydrocarbon from said droplets is between the freezing point of said aqueous medium and the boiling point of said chlorinated hydrocarbon.

8. The process according to claim 7, characterized in that said evaporating temperature is at least 15° C.

9. The process according to claim 7 or 8 characterized in that said evaporating temperature is at least 2° C. lower than the boiling point of the chlorinated hydrocarbon.

* * * * *